United States Patent
Recker et al.

(10) Patent No.: US 9,992,585 B1
(45) Date of Patent: Jun. 5, 2018

(54) HEARING ASSISTANCE SYSTEM INCORPORATING DIRECTIONAL MICROPHONE CUSTOMIZATION

(71) Applicant: Starkey Laboratories, Inc., Eden Prairie, MN (US)

(72) Inventors: Karrie LaRae Recker, Edina, MN (US); Michael Karl Sacha, Chanhassen, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days. days.

(21) Appl. No.: 15/604,353

(22) Filed: May 24, 2017

(51) Int. Cl.
*H04R 25/00* (2006.01)
*G06F 3/01* (2006.01)
*G06F 3/16* (2006.01)

(52) U.S. Cl.
CPC ........... *H04R 25/407* (2013.01); *G06F 3/017* (2013.01); *G06F 3/167* (2013.01); *H04R 25/405* (2013.01); *H04R 25/505* (2013.01); *H04R 25/552* (2013.01); *H04R 25/554* (2013.01); *H04R 2225/43* (2013.01)

(58) Field of Classification Search
CPC .. H04R 25/407; H04R 25/405; H04R 25/505; H04R 25/552; H04R 25/554; H04R 2225/43; G06F 3/017; G06F 3/167
See application file for complete search history.

(56) References Cited

U.S. PATENT DOCUMENTS

| 9,124,990 | B2 | 9/2015 | Strelcyk et al. |
| 9,332,359 | B2 | 5/2016 | Recker |
| 2012/0020503 | A1 | 1/2012 | Endo et al. |
| 2012/0163625 | A1* | 6/2012 | Siotis ............... H04R 3/005 381/92 |
| 2016/0080874 | A1* | 3/2016 | Fullam ............ H04R 25/407 381/313 |

OTHER PUBLICATIONS

Ricketts, "Directivity quantification in hearing aids: fitting and measurement effects", Ear and Hearing 21(1): Feb. 200, pp. 45-58.
Rickets et al., Directional Microphone Technology for Children, 2005, 42 pages.
Ricketts et al., "Head Angle and Elevation in Classroom Environments: Implications for Amplification", Journal of Speech, Language, and Hearing Research, vol. 51, Apr. 2008, pp. 516-525.
Staab, "How Important is Sound Localization", Hearing Health & Technology Matters, 2015, 6 pages.

* cited by examiner

*Primary Examiner* — Andrew L Sniezek
(74) *Attorney, Agent, or Firm* — Hollingsworth Davis, LLC

(57) ABSTRACT

A hearing assistance system comprises a left ear device and a right ear device respectively configured to be worn by a wearer. One or more microphones are provided at each of the left and right ear devices. One or more positional sensors are configured to determine a three-dimensional position of the hearing assistance system in response to the wearer looking at a sound source in space. A user interface is configured to receive an input directly from the wearer. A memory is configured to store the three-dimensional position of the hearing assistance system in response to the received input. A processor is configured to adjust a directional polar pattern of the one or more microphones provided at one or both of the left and right ear devices in response to the stored three-dimensional position.

22 Claims, 11 Drawing Sheets

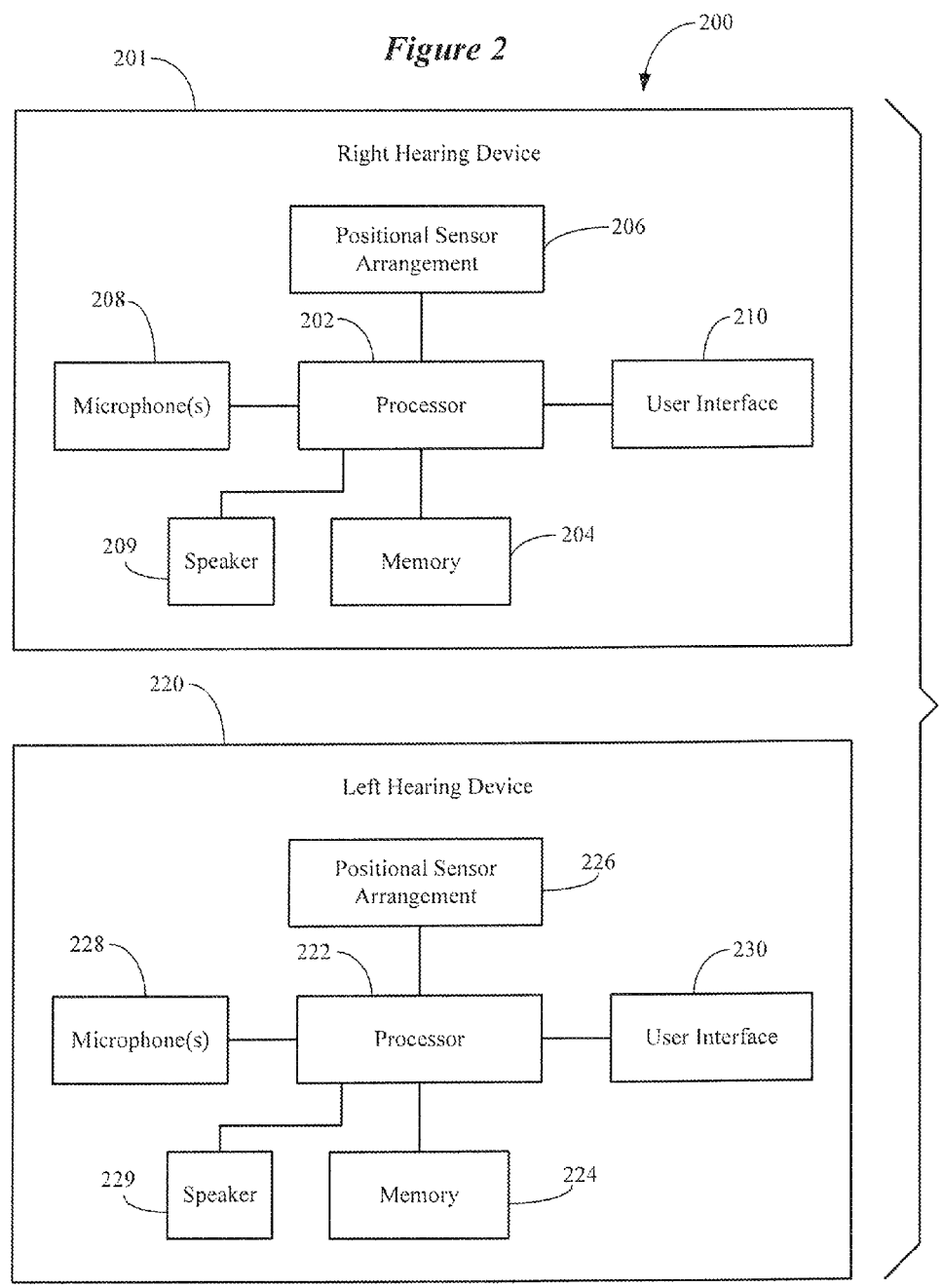

Figure 11
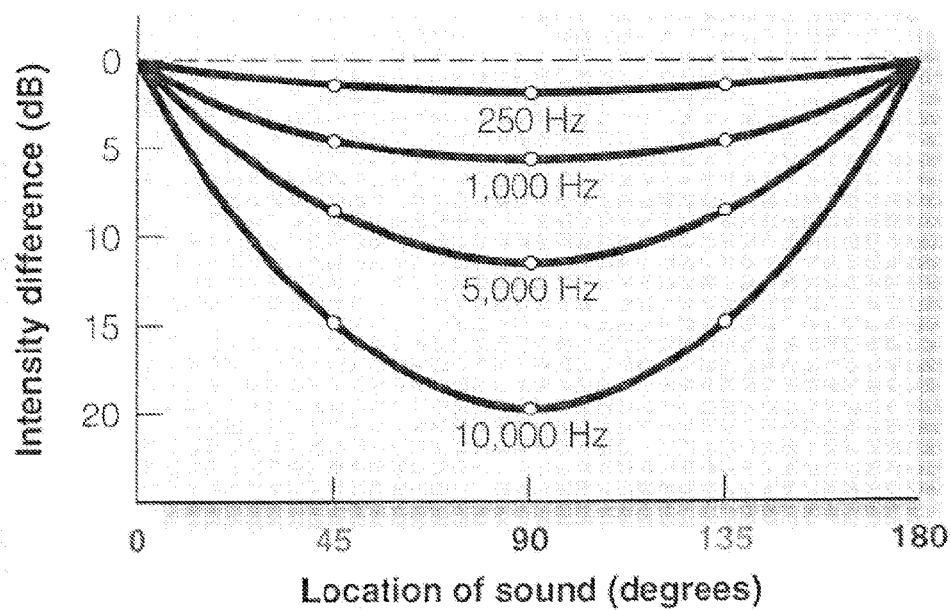
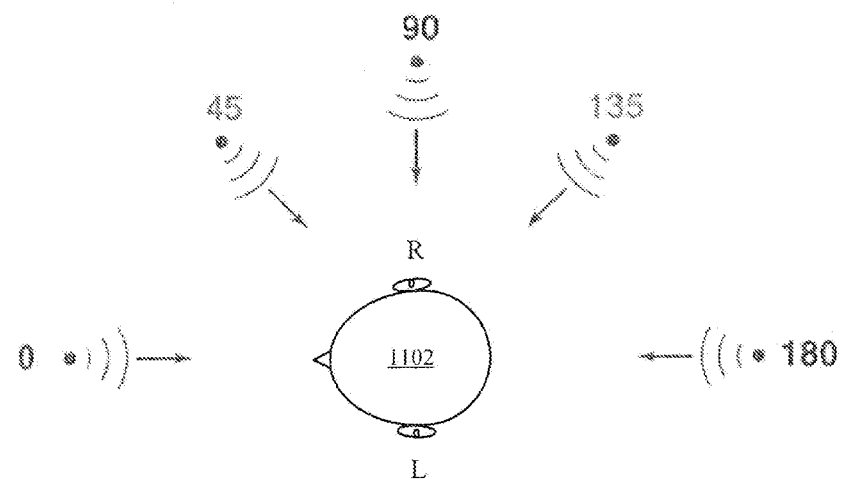

US 9,992,585 B1

HEARING ASSISTANCE SYSTEM INCORPORATING DIRECTIONAL MICROPHONE CUSTOMIZATION

TECHNICAL FIELD

This application relates generally to hearing assistance systems and devices, including hearing aids, personal amplification devices, and other hearables.

BACKGROUND

Hearing assistance devices, such as hearing aids, can assist persons suffering from hearing loss by transmitting amplified sounds to their ear canals. Damage to a person's cochlea can result in a loss of frequency resolution, making it difficult for persons to distinguish speech from environmental noise. Simple amplification of sound generally does not remedy this problem.

SUMMARY

Various embodiments are directed to a method implemented by a hearing assistance system comprising a left ear device and a right ear device respectively configured to be worn by a wearer. The method comprises determining, using one or more positional sensors of the hearing assistance system, a three-dimensional position of the hearing assistance system in response to the wearer looking at a sound source in space. The method comprises receiving an input to the hearing assistance system directly from the wearer while the wearer is looking at the sound source. The method also comprises storing, in the hearing assistance system, the three-dimensional position of the hearing assistance system in response to the received input. The method further comprises adjusting a directional polar pattern of one or more microphones of the hearing assistance system in response to the stored three-dimensional position.

According to other embodiments, a hearing assistance system comprises a left ear device and a right ear device respectively configured to be worn by a wearer. The hearing assistance system comprises one or more microphones provided at each of the left and right ear devices. One or more positional sensors are configured to determine a three-dimensional position of the hearing assistance system in response to the wearer looking at a sound source in space. A user interface is configured to receive an input directly from the wearer. A memory is configured to store the three-dimensional position of the hearing assistance system in response to the received input. A processor is configured to adjust a directional polar pattern of the one or more microphones provided at one or both of the left and right ear devices in response to the stored three-dimensional position.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 2 is a block diagram of a hearing assistance system configured to implement directional microphone customization in accordance with various embodiments;

FIGS. 10 and 11 show how interaural time differences (FIG. 10) and interaural level differences (FIG. 11) of acoustic signals follow predictable patterns based on their frequency and angle of incidence.

The figures are not necessarily to scale. Like numbers used in the figures refer to like components. However, it will be understood that the use of a number to refer to a component in a given figure is not intended to limit the component in another figure labeled with the same number;

DETAILED DESCRIPTION

Figure 1A:
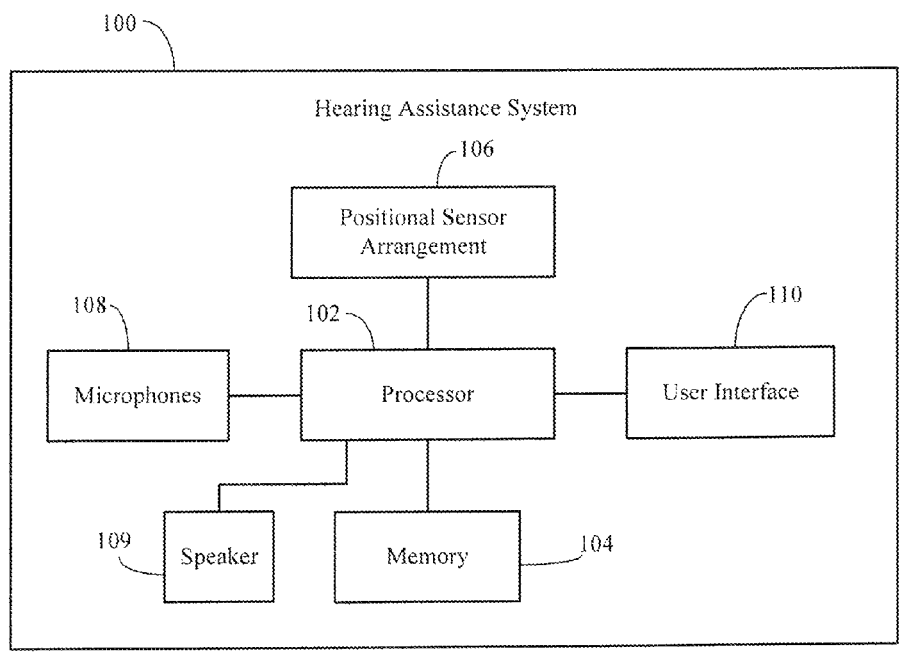
FIG. 1A is a block diagram of a hearing assistance system configured to implement directional microphone customization in accordance with various embodiments.

It is understood that the embodiments described herein may be used with any hearing assistance system or device without departing from the scope of this disclosure. The systems and devices depicted in the figures are intended to demonstrate the subject matter, but not in a limited, exhaustive, or exclusive sense. It is also understood that the present subject matter can be used with a hearing assistance system or device designed for use in or on the right ear or the left ear or both ears of the wearer.

Hearing assistance devices, such as hearing aids and hearables (e.g., wearable earphones and earbuds), typically include an enclosure, such as a housing or shell, within which internal components are disposed. Typical components of a hearing assistance device can include a digital signal processor (DSP), memory, power management circuitry, one or more communication devices (e.g., a radio, a near-field magnetic induction device), one or more antennas, one or more microphones, and a receiver/speaker, for example. More advanced hearing assistance devices can incorporate a long-range communication device, such as a Bluetooth® transceiver or other type of radio frequency (RF) transceiver.

The term hearing assistance system or device refers to a wide variety of apparatuses that can aid a person with impaired hearing. The term hearing assistance system or device also refers to a wide variety of apparatuses that can produce optimized or processed sound for persons with normal hearing. Hearing assistance systems and devices of the present disclosure include hearables (e.g., wearable earphones, headphones, earbuds, virtual reality headsets), hearing aids (e.g., hearing instruments), cochlear implants, and bone-conduction devices, for example. Hearing assistance systems and devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing assistance devices or some combination of the above. Throughout this disclosure, reference is made to a "hearing assistance device" or a "hearing assistance system," which is understood to refer to a single hearing assistance device (for a single ear) or a pair of hearing assistance devices (one for each ear).

Embodiments of the disclosure are directed to hearing assistance systems and devices that allow the wearer to customize the directionality of one or more microphones without the need for an accessory device. More particularly, hearing assistance systems and devices of the disclosure allow the wearer to interact directly with the worn system or device to customize the directional polar pattern of one or more microphones without the need for an accessory device. In some embodiments, the wearer interacts directly with a hearing assistance system or device to customize the directional polar pattern of one or more microphones to enhance reception of one or more target sound sources of interest (e.g., a person speaking on the right side of the wearer). In other embodiments, the wearer interacts directly with a hearing assistance system or device to customize the directional polar pattern of one or more microphones to attenuate reception of one or more noise sources (e.g., a machine or persons speaking behind the wearer that are not of interest). In further embodiments, the wearer interacts directly with a hearing assistance system or device to customize the directional polar pattern of one or more microphones to both enhance reception of one or more target sound sources of interest and to attenuate reception of one or more noise sources.

Various embodiments are directed to hearing aids that include directional microphones to improve the signal-to-noise ratio (SNR) for hearing-impaired listeners in noisy situations. To improve the SNR, directional microphones can be designed to optimize the signal that is coming from one direction (usually in front of the hearing-aid wearer) while attenuating sound that is coming from another direction (usually behind the hearing-aid wearer). Early directional microphones that were implemented in hearing aids used fixed polar patterns, meaning the directions of maximum sensitivity and attenuation did not change. An obvious limitation of this type of directional system is that it could not adapt to optimize the SNR based on the acoustics of a particular environment.

Once digital hearing aids became available, adaptive directionality was possible. By adjusting the time delays between the two microphones, the polar pattern could be altered to optimize the SNR for a particular environment. However, this type of directionality has certain limitations. For example, before the hearing aids can adapt their processing to maximize the SNR, they must first analyze the signals from the microphones to estimate the locations of the signal(s) of interest and/or the noise source(s). Once these estimates are made, the hearing aids can steer the "null" (i.e. the angle of maximum attenuation) to reduce the noise sources and preserve any speech signals. Analyzing the environment and adapting to the environment both take time, and while the hearing aids are performing this processing, the hearing-aid wearer may miss important information that is coming from the signal source of interest.

Another problem with adaptive directionality is that even if the hearing aids are able to optimize the SNR for that environment, the "signal" that the microphones optimize is not necessarily the signal that is of interest to the hearing-aid wearer. Because hearing aids generally assume that "speech" is the signal of interest, they optimize their processing for that signal wherever it is detected. The result is that the hearing aids may focus on speech from a talker other than the one with whom the hearing-aid wearer hopes to communicate. This may result in missed information when the talker of interest does speak. Potentially, this scenario could occur in any situation in which the hearing aids detect multiple talkers (e.g. restaurants, parties, sporting events, in the car, etc.).

One approach to improving the directionality of hearing aid microphones involves the use of a smartphone or a remote control to indicate the direction of speech and/or noise sources using an application executed by the smartphone or remote control. However, this approach requires the hearing-aid wearer to use an accessory device to indicate the location of target and/or noise sources. Because the smartphone or remote control is held in the hand and physically unconnected to and spaced apart from the hearing aids, locating a target or noise source can be inaccurate. Moreover, such approaches do no take the vertical plane into consideration when adjusting the directionality of the hearing aid microphones.

FIG. 1A is a block diagram of a hearing assistance system 100 configured to implement directional microphone customization in accordance with various embodiments. The hearing assistance system 100 shown in FIG. 1A can represent a single hearing assistance device (e.g., a monaural or single-ear device) or a pair of hearing assistance devices (e.g., a binaural or dual-ear devices). The hearing assistance system 100 includes a processor 102 coupled to a memory 104. The processor 102 is coupled to one or more microphones 108, such as a microphone array, which are configured as directional microphones. The hearing assistance system 100 also includes a positional sensor arrangement 106. The positional sensor arrangement 106 includes one or more sensors configured to sense a three-dimensional position of the hearing assistance system 100. The processor 102 cooperates with the positional sensor arrangement 106 to determine the three-dimensional position of the hearing assistance system 100 as the hearing assistance system 100 moves in response to movement of the wearer's head. The positional sensor arrangement 106 can comprise one or more of an inertial measurement unit (IMU), an accelerometer, a gyroscope, a nine-axis sensor, a magnetometer (e.g., a compass), and a GPS sensor. The IMU can be of a type disclosed in commonly owned U.S. patent application Ser. No. 15/331,230, filed Oct. 21, 2016, which is incorporated herein by reference.

The hearing assistance system 100 also includes a user interface 110 coupled to the processor 102. The user interface 110 is configured to receive an input directly from the wearer of the hearing assistance system 100. The input from the wearer can be a touch input, a gesture input, or a voice input. The user interface 110 can include one or more of a tactile interface, a gesture interface, and a voice command interface. The tactile interface can include one or more manually actuatable switches (e.g., a push button, a toggle switch, a capacitive switch). For example, and with reference to FIG. 1B, the user interface 110 can include a number of manually actuatable buttons or switches 110a. One of the switches, switch 110*b* for example, can be designated to be the switch usable by the wearer when customizing the directionality of the microphones 108 in accordance with various embodiments.

According to various embodiments, each button or switch 110*a* can have its own function. For example, one button can be used to indicate target sound sources, another noise sources, and another to reset the hearing assistance system 100 to an omnidirectional or a fully automatic microphone mode. In embodiments that include a left and a right hearing assistance device, multiple buttons can be located on one hearing assistance device. Alternatively, a button to indicate target sound sources can be located on one hearing assistance device and a button to indicate noise sources can be located on the other hearing assistance device. A reset button can be located on either (or both) hearing assistance devices.

The gesture interface can be defined by one or more of the sensors of the positional sensor arrangement 106 operating in cooperation with the processor 102. For example, the positional sensor arrangement 106 can detect a head nod or a head shake made by the wearer, which can be interpreted by the processor 102 as inputs made by the wearer during directional microphone customization. A head nod can be interpreted by the processor 102 to indicate that the sound is from a target sound source of interest. A head shake can be interpreted by the processor 102 to indicate that the sound is from a noise source. The voice command interface can be defined by one or more of the microphones 108 operating in cooperation with the processor 102. For example, the processor 102 can execute a voice recognition application and recognize predetermined voice commands uttered by the wearer as an input during directional microphone customization.

Figure 1B:
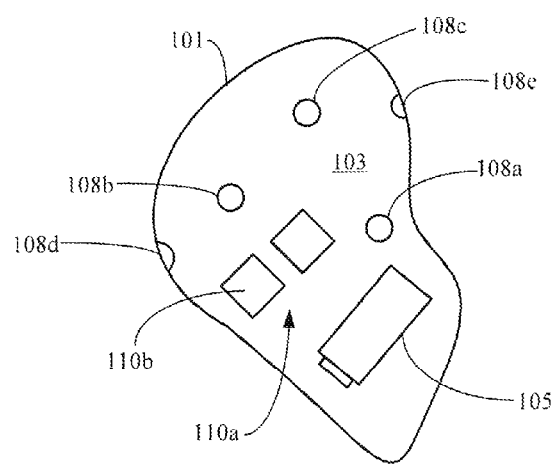
FIG. 1B shows a hearing assistance device equipped with a multiplicity of microphones and electronics configured to implement directional microphone customization in accordance with various embodiments.

The directional microphone array 108 is configured such that the lobe of sensitivity and/or the null position can be directed at desired angles. For example, the lobe of a directional microphone 108 can be directed at a target sound source of interest to the wearer to enhance reception of the target sound source. The null of a directional microphone can be directed at a noise source to attenuate reception of the noise source. As is shown in FIG. 1B, a hearing assistance device 101 (e.g., a left ear device) can include a multiplicity of microphones 108. FIG. 1B shows the exposed surface 103 of the housing of an ITE hearing aid. As shown, the exposed surface 103 includes three microphones 108*a*, 108*b*, and 108*c*, a switch arrangement 110*a*, and a battery drawer cover 105. The microphones 108*a*, 108*b*, and 108*c* can be omni or directional microphones or a combination thereof. For example, the microphones 108*a*, 108*b*, and 108*c* can have a single port or multiple ports. Some or all of the microphones 108*a*, 108*b*, and 108*c* can define a directional microphone array.

The three microphones 108*a*, 108*b*, and 108*c* can be positioned on different vertical planes of the exposed surface 103 which can provide for improved directivity in the vertical plane (see discussion below). It is noted that for BTE or RIC hearing aids, a third microphone can be provided on the body of the hearing aid, on the ear hook or on the ear piece that goes into the ear canal. As an alternative to a third microphone, a pair of microphones can be placed on a rotating fixture in or on the hearing assistance device 101 that automatically adjusts (rotates) to compensate for changes in head elevation. In some embodiments, the hearing assistance device 101 can include a front microphone 108*d* and a back microphone 108*e*.

As will be described in detail, the lobe or the null position of each of the microphones 108*a*, 108*b*, and 108*c* may be customized based on the wearer's input to the user interface 110. Multiple target and noise sources can be indicated by the wearer. It is noted that the maximum number of target and noise sources that can be indicated by the wearer will depend on the number of microphones available on the hearing assistance device 101. Generally, the number of independent nulls in a directional polar pattern of a microphone array with N microphones is N−1. For example, a pair of hearing assistance devices 101 with two microphones each (4 total) can suppress three noise sources. A pair of hearing assistance devices 101 with three microphones each (6 total) can suppress five noise sources, and so on.

Although not shown in FIG. 1A, the hearing assistance system 100 can incorporate an antenna arrangement coupled to a high-frequency radio, such as a 2.4 GHz radio. The radio can conform to an IEEE 802.11 (e.g., WiFi®) or Bluetooth® (e.g., BLE, Bluetooth® 4. 2 or 5.0) specification, for example. It is understood that the hearing assistance system 100 can employ other radios, such as a 900 MHz radio. In addition, or alternatively, the hearing assistance system 100 can include a near-field magnetic induction (NFMI) sensor for effecting short-range communications (e.g., ear-to-ear communications).

FIG. 2 is a block diagram of a hearing assistance system 200 configured to implement directional microphone customization in accordance with various embodiments. The hearing assistance system 200 shown in FIG. 2 includes a right hearing device 201 and a left hearing device 220. The right hearing device 201 includes a processor 202 coupled to a memory 204, a user interface 210, a speaker/receiver 209, and one or more directional microphones 208. The right hearing device 201 also includes a positional sensor arrangement 206 coupled to the processor 202. The right hearing device 220 includes a processor 222 coupled to a memory 224, a user interface 230, a speaker/receiver 229, and one or more directional microphones 228. The processor 222 is also coupled to a positional sensor arrangement 226. The components of the right and left hearing devices 201 and 222 shown in FIG. 2 can be the same or similar as those shown in FIGS. 1A and 1B. The right and left hearing devices 201 and 220 can communicate with one another via a short-range communication link, such as an NFMI or Bluetooth® (e.g., BLE) link.

Figure 3:
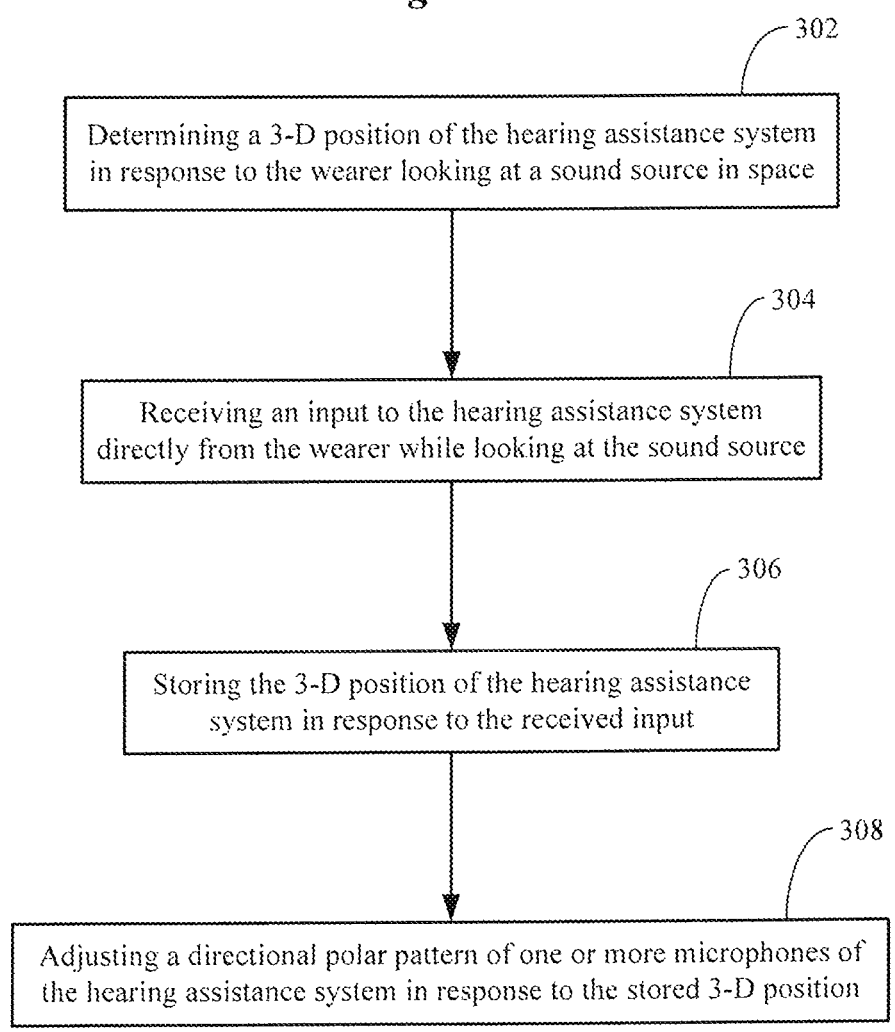
FIG. 3 is a flow chart illustrating various processes for implementing directional microphone customization in accordance with various embodiments.

FIG. 3 is a flow chart illustrating various processes for implementing directional microphone customization in accordance with various embodiments. The processes shown in FIG. 3 and other figures can be implemented by the systems and devices illustrated in FIGS. 1A, 1B, and 2. The method shown in FIG. 3 involves determining 302 a three-dimensional position of the hearing assistance system in response to the wearer looking at a sound source in space. The method involves receiving 304 an input to the hearing assistance system directly from the wearer while the wearer is looking at the sound source. The method also involves storing 306 the three-dimensional position of the hearing assistance system in response to the received input. The method further involves adjusting 308 a directional polar pattern of one or more microphones of the hearing assistance system in response to the stored three-dimensional position.

Figure 4:
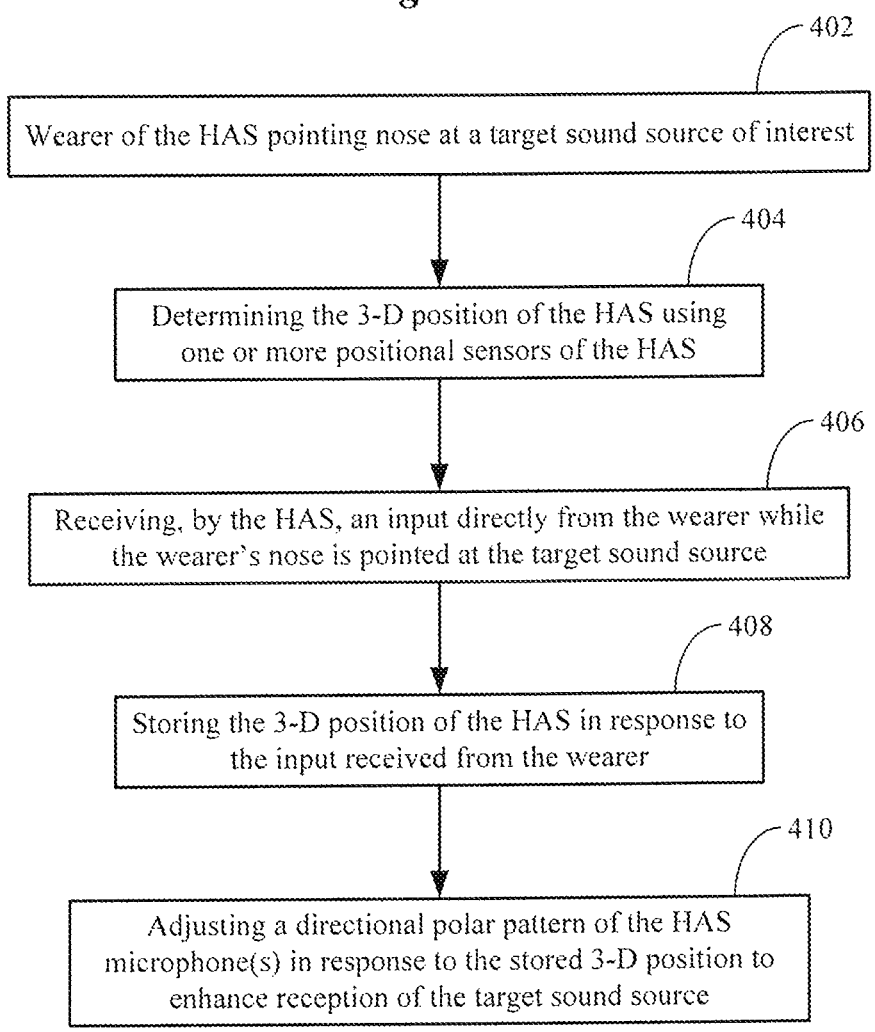
FIG. 4 is a flow chart illustrating various processes for implementing directional microphone customization in accordance with various embodiments.
Figure 5:
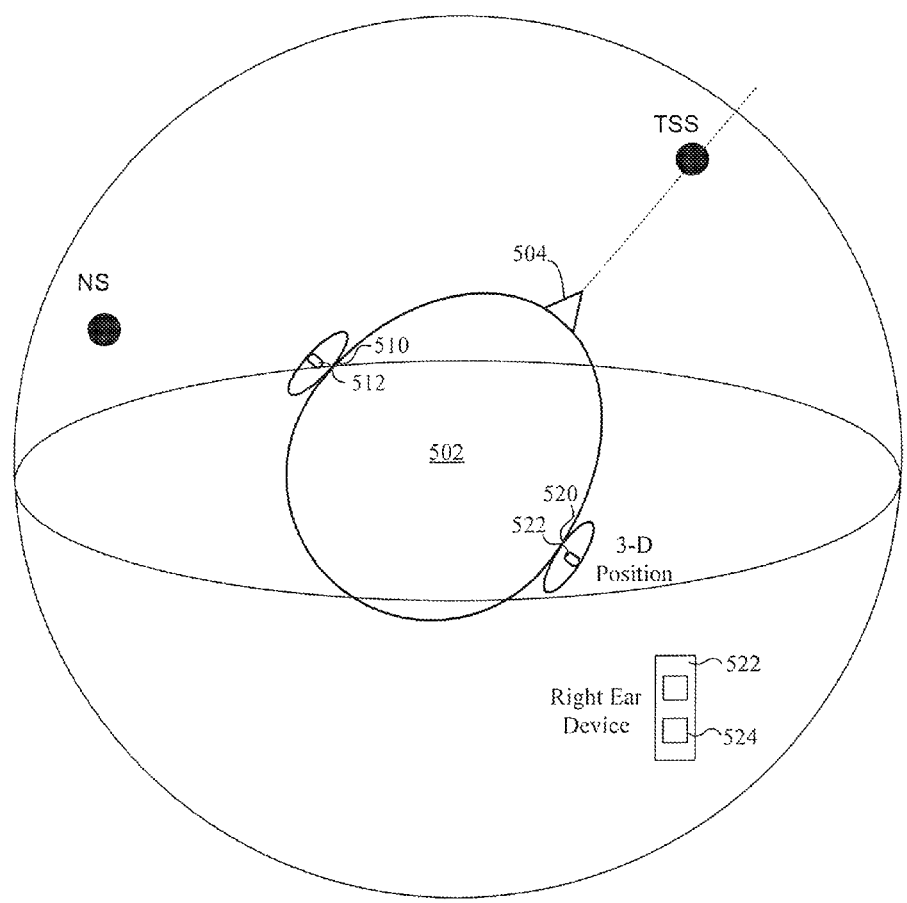
FIG. 5 shows the head of a wearer of a hearing assistance system that facilitates an understanding of the processes shown in FIG. 4.

FIG. 4 is a flow chart illustrating various processes for implementing directional microphone customization in accordance with various embodiments. FIG. 5 shows the head of a wearer 502 of a hearing assistance system that facilitates an understanding of the processes shown in FIG. 4. In FIGS. 4 and 5, it is assumed that the hearing assistance system includes a left hearing assistance device 512 worn in/on the left ear 510 and a right hearing assistance device 522 worn in/on the right ear 520. In this illustrative example, the right hearing assistance device 522 includes one or more user actuatable switches, including switch 524. FIG. 5 shows a target sound source, TSS, of interest to the wearer 502 and a noise source, NS. In this illustrative example, the wearer 502 desires to enhance reception of the target sound source, TSS, and suppress the noise source, NS.

The method shown in FIG. 4 involves the wearer 502 of the hearing assistance system (HAS) pointing 402 his or her nose 504 at the target sound source of interest, TSS. The target sound source, TSS, can be located anywhere in space. For example, the target sound source, TSS, can be located anywhere on the horizontal plane (e.g., left, right, in front, in back), and anywhere on the vertical plane (e.g., at ear level, or above or below ear level). The method involves determining 404 the three-dimensional position of the hearing assistance system using one or more positional sensors of the HAS. The method involves receiving 406, by the HAS, an input directly from the wearer 502 while the wearer's nose 504 is pointed at the target sound source, TSS. For example, the wearer 502 can depress the switch 524 on the right hearing assistance device 522 while the wearer's nose 504 is pointed at the target sound source, TSS. As an alternative to depressing the switch 524, a gesture (e.g., a head nod) or a voice command (e.g., "capture target position") can be sensed/received by HAS while the wearer's nose 504 is pointed at the target sound source, TSS.

The method also involves storing 408 the three-dimensional position of the HAS in response to the input (e.g., switch, gesture, or voice command) received from the wearer. The method further involves adjusting 410 a directional polar pattern of an HAS microphone in response to the stored three-dimensional position to enhance reception of the target sound source, TSS. For example, the axis of the lobe of sensitivity of an HAS microphone can be redirected to align with the target sound source, TSS, based on the stored three-dimensional position of the HAS. The processes shown in FIG. 4 can be repeated for a number of different target sound sources depending on the number of available microphones (e.g., N-1 target sound sources for N microphones).

Figure 6:
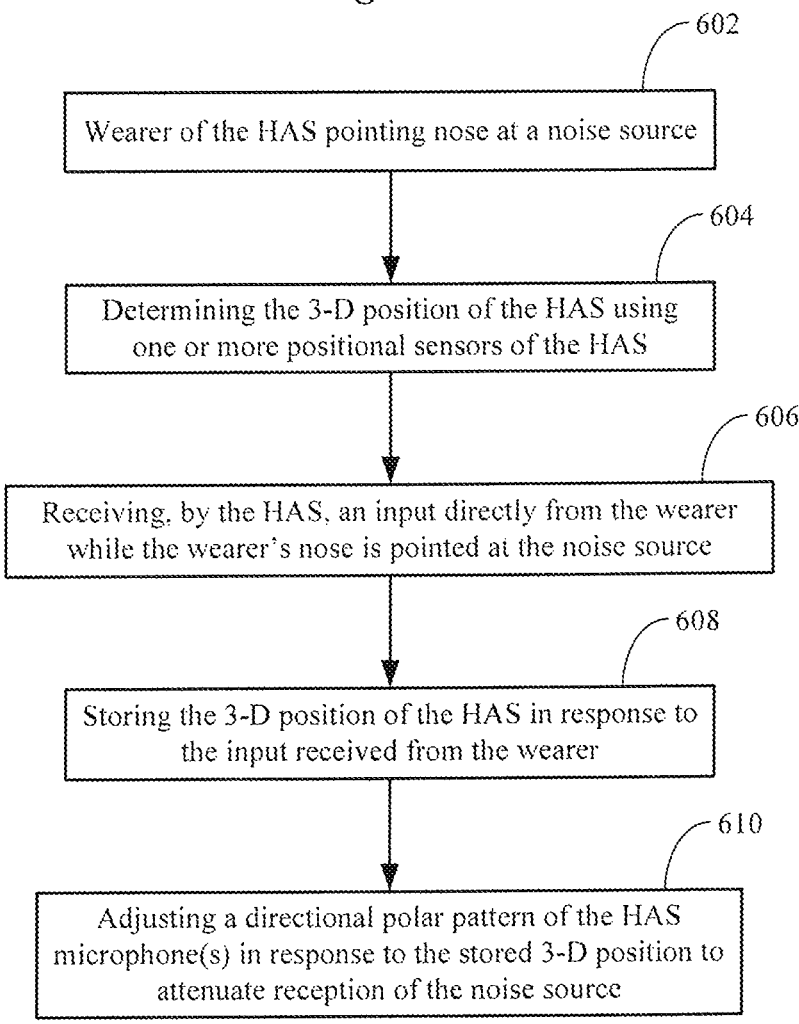
FIG. 6 is a flow chart illustrating various processes for implementing directional microphone customization in accordance with various embodiments.
Figure 7:
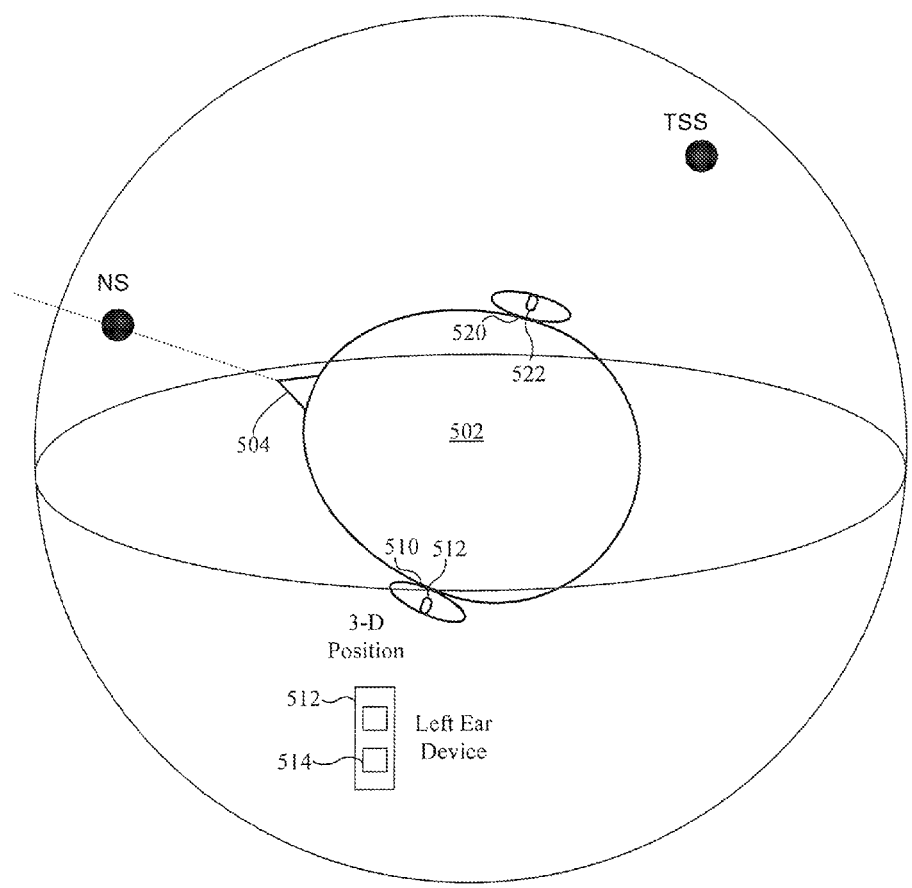
FIG. 7 shows the head of a wearer of a hearing assistance system that facilitates an understanding of the processes shown in FIG. 6.

FIG. 6 is a flow chart illustrating various processes for implementing directional microphone customization in accordance with various embodiments. FIG. 7 shows the head of a wearer 502 of a hearing assistance system that facilitates an understanding of the processes shown in FIG. 6. In FIGS. 6 and 7, it is assumed that the hearing assistance system includes a left hearing assistance device 512 worn in/on the left ear 510 and a right hearing assistance device 522 worn in/on the right ear 520. In this illustrative example, the left hearing assistance device 512 includes one or more user actuatable switches, including switch 514. FIG. 7 shows a noise source, NS, that the wearer 502 wishes to suppress.

The method shown in FIG. 6 involves the wearer 502 of the hearing assistance system pointing 602 his or her nose 504 at the noise source, NS. The noise source, NS, can be located anywhere in space (e.g., anywhere on the horizontal plane and anywhere on the vertical plane). The method involves determining 604 the three-dimensional position of the hearing assistance system using one or more positional sensors of the HAS. The method involves receiving 606, by the HAS, an input directly from the wearer 502 while the wearer's nose 504 is pointed at the noise source, NS. The wearer 502 can, for example, depress the switch 514 on the left hearing assistance device 512 while the wearer's nose 504 is pointed at the noise source, NS. As an alternative to depressing the switch 514, a gesture (e.g., a head shake) or a voice command (e.g., "capture noise position") can be sensed/received by the HAS while the wearer's nose 504 is pointed at the noise source, NS.

The method also involves storing 608 the three-dimensional position of the HAS in response to the input (e.g., switch, gesture, or voice command) received from the wearer. The method further involves adjusting 610 a directional polar pattern of an HAS microphone in response to the stored three-dimensional position to attenuate reception of the noise source, NS. For example, the axis of the null of an HAS microphone can be redirected to align with the noise source, NS, based on the stored three-dimensional position of the HAS. The processes shown in FIG. 6 can be repeated for a number of different noise sources depending on the number of available microphones (e.g., N-1 noise sources for N microphones).

Figure 8:
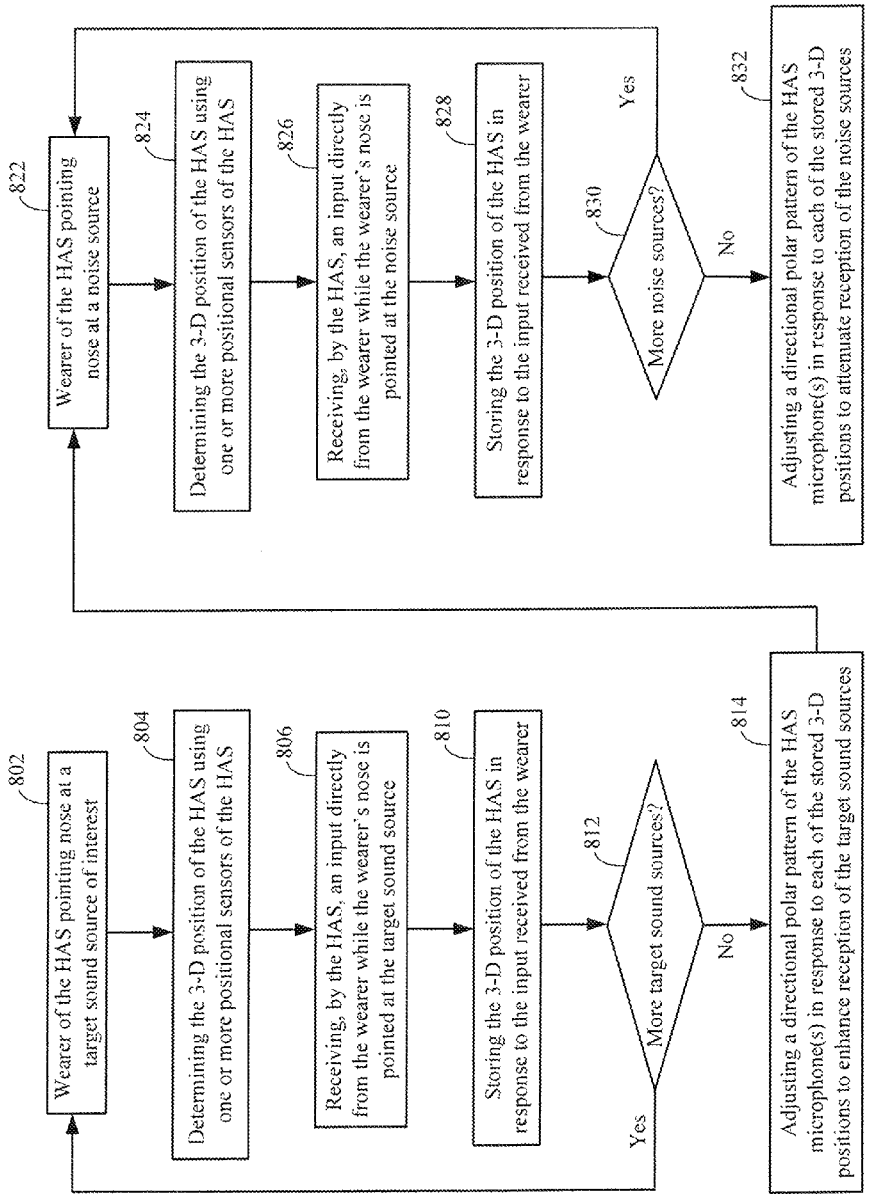
FIG. 8 is a flow chart illustrating various processes for implementing directional microphone customization in accordance with various embodiments.

FIG. 8 is a flow chart illustrating various processes for implementing directional microphone customization in accordance with various embodiments. The method shown in FIG. 8 illustrates processes that facilitate wearer-driven customization of the directional polar patterns of a multiplicity of microphones of a hearing assistance system. More particularly, the processes shown in FIG. 8 allow a wearer to customize the directionality of different microphones to both enhance reception of target sound sources and suppress noise sources.

The method shown in FIG. 8 involves the wearer of the hearing assistance system pointing 802 his or her nose at a target sound source of interest. As was previously discussed, the target sound source can be located anywhere in space. The method involves determining 804 the three-dimensional position of the hearing assistance system using one or more positional sensors of the HAS. The method involves receiving 806, by the HAS, an input (e.g., right ear device switch actuation, a gesture, a voice command) directly from the wearer while the wearer's nose is pointed at the target sound source. The method also involves storing 810 the three-dimensional position of the HAS in response to the input (e.g., switch, gesture, or voice command) received from the wearer. A check 812 is made to determine if there are more target sound sources to be identified by the wearer. If so, the wearer points his or her nose to the next target sound source and the processes of blocks 804-812 are repeated.

The method further involves adjusting 814 a directional polar pattern of the HAS microphones in response to the stored three-dimensional positions to enhance reception of the target sound sources. For example, the axis of the lobe of sensitivity of a first HAS microphone can be redirected to align with a first target sound source based on a first stored three-dimensional position of the HAS. The axis of the lobe of sensitivity of a second HAS microphone can be redirected to align with a second target sound source based on a second stored three-dimensional position of the HAS. The first target sound source, for example, can be a person speaking near the wearer's right ear, and the second target sound source can be a person speaking near the wearer's left ear.

The method shown in FIG. 8 further involves the wearer of the hearing assistance system pointing 822 his or her nose at a noise source. As was previously discussed, the noise source can be located anywhere in space. The method involves determining 824 the three-dimensional position of the hearing assistance system using one or more positional sensors of the HAS. The method involves receiving 826, by the HAS, an input (e.g., left ear device switch actuation, a gesture, a voice command) directly from the wearer while the wearer's nose is pointed at the noise source. The method also involves storing 828 the three-dimensional position of the HAS in response to the input (e.g., switch, gesture, or voice command) received from the wearer. A check 830 is made to determine if there are more noise sources to be identified by the wearer. If so, the wearer points his or her nose at the next noise source and the processes of blocks 824-830 are repeated. The method further involves adjusting 832 a directional polar pattern of the HAS microphones in response to the stored three-dimensional positions to attenuate reception of the noise sources.

For example, it is assumed that a first stored three-dimensional position of the HAS is associated with a first target sound source, and that a second stored three-dimensional position of the HAS is associated with a second target sound source. It is also assumed that a third stored three-dimensional position of the HAS is associated with a first noise source, and that a fourth stored three-dimensional position of the HAS is associated with a second noise source. The first noise source, for example, can be persons speaking behind the wearer, and the second noise source can be persons speaking in front of the wearer.

As was discussed previously, and with reference again to FIG. 1B, an HAS can be equipped with a multiplicity of microphones positioned on different vertical planes of the HAS housing to provide for improved directivity in the vertical plane. In the embodiment shown in FIG. 1B, the exposed surface 103 of the hearing assistance device 101 includes three microphones 108a, 108b, and 108c positioned on different vertical planes of the exposed surface 103. The following scenario illustrates how a positional sensor arrangement of an HAS in cooperation with multiple directional microphones situated on different vertical planes can track changes in elevation of the wearer's head relative to a sound source. In this illustrative scenario, the HAS wearer indicates the three-dimensional position of the target/noise source(s) in space in a manner previously described (e.g., by pressing a button on the right hearing assistance device for a target sound source and a button on the left hearing assistance device for a noise source). In response to button actuation, the positional sensors of the HAS capture the directions of the target sound source and noise source.

As the HAS wearer moves his or her head, the positional sensors determine whether the wearer has significantly increased or decreased his/her head elevation (e.g., by x°, where "x" is a configurable parameter by the manufacturer). When the threshold "x" is crossed, the HAS can change which microphones it is using to create the directional polar pattern. For example, by default, the hearing assistance devices can use the two lower microphones (e.g., microphones 108a and 108b in FIG. 1B). If the HAS wearer significantly increases the level of his/her head, the hearing assistance devices can switch to using the top microphone (e.g., microphone 108c) and a front microphone (e.g., microphone 108d). If the wearer lowered his/her head by a significant amount, the HAS can switch to using the top microphone (e.g., microphone 108c) and the back microphone (e.g., microphone 108e). Similarly, if the HAS wearer were to change elevation relative to the sound source (e.g., by stepping up to the top of a set of stairs or a deck), the positional sensors can detect this change in vertical position and select the correct microphone combination.

At some time following directional microphone customization as described hereinabove, it may be desirable to reset the hearing assistance system to an omnidirectional polar pattern or a fully automatic microphone mode. In a fully automatic microphone mode, the hearing assistance system determines whether the microphones should be in an omnidirectional or a directional mode using predetermined criteria. It is noted that if a directional mode is selected, the hearing assistance device determines where the nulls of the polar pattern should be placed. The predetermined criteria can include one or more of the following: the hearing assistance system detects a change in the acoustics of the environment; the hearing assistance system detects a change in the geographic location of the environment (e.g., using a GPS sensor); a predetermined amount of time has passed (e.g., 1 hour); the target/noise location information is cleared from the hearing assistance system (e.g. by pushing and holding a switch on the hearing assistance system for 3 seconds); the memory of the hearing assistance system is changed; the battery door of the hearing assistance system is opened and the hearing assistance system is rebooted.

After completing the initial directional microphone customization as described hereinabove, various strategies can be employed for updating the directional polar pattern of the HAS microphones. Strategies I-V are provided below as illustrative examples.

Strategy I: In the simplest approach, the directional polar pattern of the microphone(s) can remain at a fixed angle. For example, if the wearer indicates that the target sound source of interest is at 90° (relative to their normal, front-facing, head position), as may occur for a driver of a vehicle with a front-seat passenger, the directional polar pattern will remain optimized for that angle.

Strategy II: A more advanced implementation involves the hearing assistance system tracking the wearer's head movements through the use of one or more positional sensors. If the wearer changes his or her head position as sensed by the positional sensor(s), the processor of the hearing assistance system adjusts the directional polar pattern accordingly. This type of functionality may be useful in situations such as sporting events in which an HAS wearer may toggle his or her attention between the person at his/her side and the sporting event.

Figure 9:
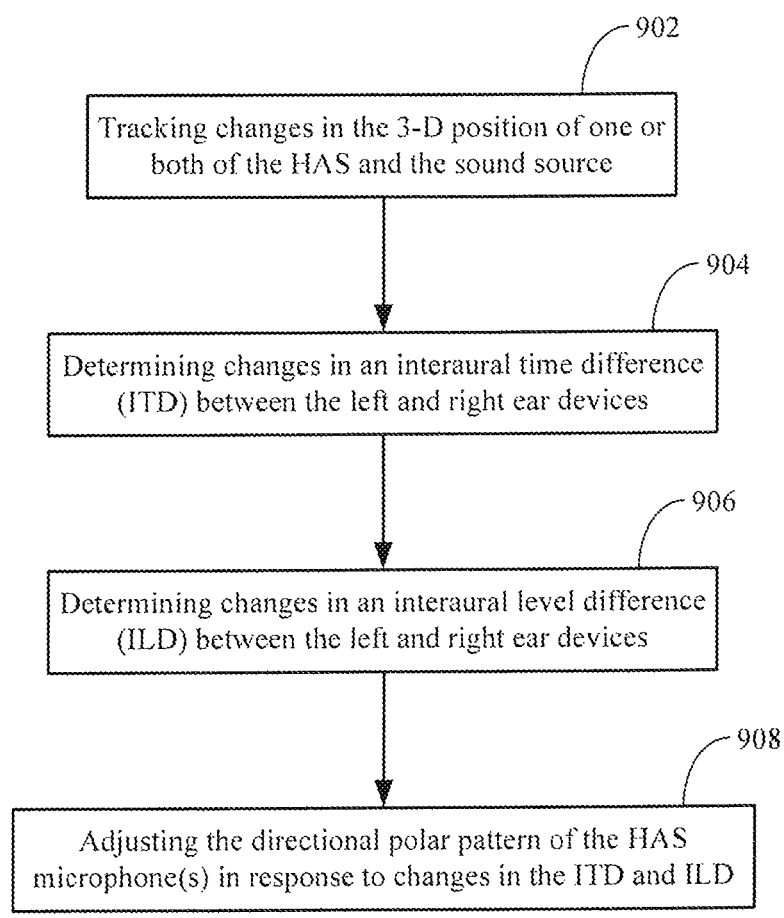
FIG. 9 is a flow chart showing various processes for implementing directional microphone customization in accordance with various embodiments.

Strategy III: Another advanced implementation involves tracking the movements of the sound source of interest (which can be a target sound source or a noise source). In this implementation, the hearing assistance system includes two hearing assistance devices, one for each ear. FIG. 9 is a flow chart showing various processes for implementing Strategy III in accordance with various embodiments. The method shown in FIG. 9 involves tracking 902 changes in the three-dimensional position of one or both of the HAS and the sound source. The method involves determining 904 changes in an interaural time difference (ITD) between the left and right hearing assistance devices. The method also involves determining 906 changes in an interaural level difference (ILD) between the left and right hearing assistance devices. The method further involves adjusting 908 the directional polar pattern of the HAS microphone(s) in response to changes in the ITD and ILD. It is noted that determining changes in the ITD and ILD (blocks 904 and 906) can be performed following a calibration measurement that occurs when the HAS wearer is looking at a target/noise source.

Figure 10:
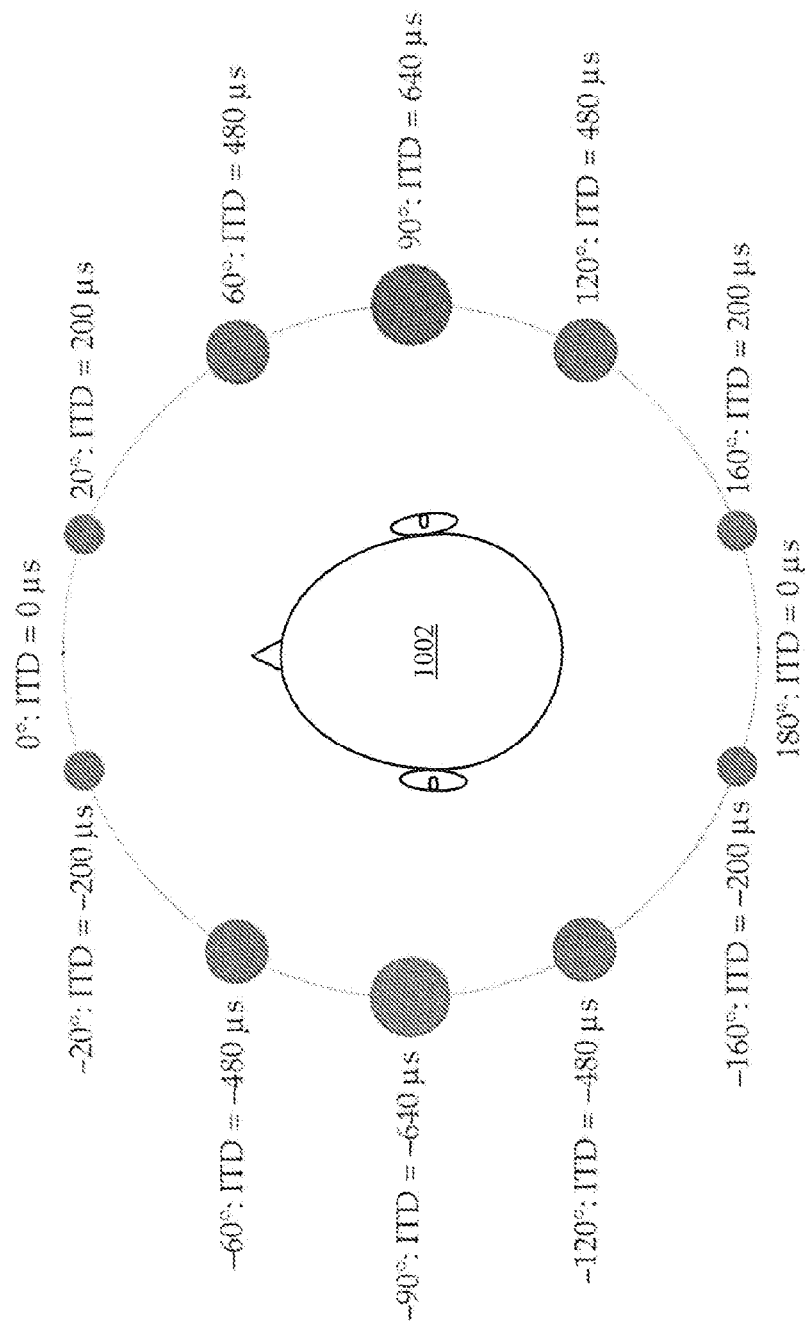

According to one approach to implementing Strategy III, once the target sound sources of interest have been identified by the wearer, the hearing assistance devices can compare the sound signals that reach the two devices in terms of their ITDs and ILDs, respectively, across frequency. FIGS. 10 and 11 show how ITDs (FIG. 10) and ILDs (FIG. 11) of acoustic signals follow predictable patterns based on their frequency and angle of incidence. Because the ITDs and ILDs follow predictable patterns based on the angle of incidence of a sound source, it is possible to determine the frequency response of a signal by determining the frequencies at which the incoming sound is following the expected ITD/ILD pattern. Once identified, the hearing assistance system can track that signal if it were to move from its original position. Knowledge of additional details about the signal (e.g., its fundamental frequency, harmonics, sound class and/or the signal-to-noise ratio (SNR) at those frequencies) can help to identify the signal and determine whether it is moving. Further, knowledge of the frequency responses of the desirable and undesirable signals can be used to adjust the gain for those signals. It is understood that, in order to use the ITD information, the sampling rates of the left and right hearing assistance devices need to be synchronized (e.g., via ear-to-ear communication using an NFMI or BLE link).

The following illustrative scenario for implementing Strategy III assumes that the target sound source is a person located at 90° relative to the HAS wearer. According to this scenario, the wearer looks at the target sound source and actuates a button on the right hearing assistance device to indicate the direction of the target sound source. The three-dimensional position of the HAS is captured in response to the button actuation. A sample of the sound in the environment is taken. The HAS analyses the sound to determine the frequencies at which the interaural time and level differences between the two hearing assistance devices are approximately 0 (±some amount of tolerance, e.g., 100 µs for ITDs or 3 dB for ILDs). It is noted that ILDs may have a frequency-specific tolerance, because they will vary with frequency.

Reference is made again to FIGS. 10 and 11. Frequencies at which the ITDs and ILDs are close to 0 represent those that are likely part of the stimulus of interest. For purpose of illustration, it is assumed that that when the HAS wearer marks a target sound source, the concurrent sound sample shows that at 5 kHz the ITDs and ILDs are close to 0, and therefore we suspect that the target sound source has energy at this frequency. When the HAS wearer turns his/her head back to 0°, it is expected that incoming sounds at 5 kHz will be delayed by 640 µs at the far ear, and to be about 10 dB lower at the far ear. If this is the pattern that is observed, it can be assumed that the target is at 90° relative to the HAS, and the hearing assistance devices can optimize the directional polar pattern for that angle.

If the HAS wearer is moving (e.g., he/she is on a walk), but the target sound source is not moving, it is expected that when the target individual speaks, the angle would be different—gradually shifting from 90° to (almost) 180°, depending on how far away the HAS wearer has walked. In this scenario, it is expected that the ITDs will gradually decrease from 640 µs to close to 0 µs and the ILDs will shift from ~10 dB to close to 0 dB, again, depending on how far the hearing aid wearer has walked.

If, however, the HAS wearer walked, but the hearing assistance devices detected no change in the ITDs and ILDs (i.e. they were still consistent with the target talker being located at 90 degrees), this would indicate that the target talker is walking with the HAS wearer and that the hearing assistance devices should stay optimized for that sound location.

Alternatively, if the HAS wearer is not moving (e.g., the positional sensors detect no movement), but the ITDs and ILDs are changing for 5 kHz (assuming they gradually shift from 640 µs to 200 µs and 10 dB to 3 dB), this would suggest that the target talker has moved from a position of 90° to approximately 20°. Similar analyses can be performed for other frequencies where significant energy is detected at the target and noise source locations.

In short, by comparing what the positional sensors of the HAS detect about the position and the movement of the wearer with an analysis of the incoming acoustics, the hearing assistance devices can make an educated determination as to whether the target and noise sources are moving relative to the HAS wearer. This information can be used to optimize the directional polar patterns of the HAS microphones.

Strategy IV: This strategy incorporates the implementations of Strategies II and III above and concurrently tracks the wearer's movements and the movements of the signal(s) of interest/noise sources and adjusts the directional polar pattern and other signal processing accordingly.

Strategy V: The wearer of the hearing assistance system can be given the option of customizing the hearing assistance devices (left and right) together or separately. Joint customization may be ideal if there is only one signal of interest. However, individual customization may offer more benefit when multiple signals (that are not co-located) are of interest. For example, if the wearer is talking to two people at a party—one at −45° and one at 45°, it may be advantageous for the left hearing assistance device to focus on the −45° signal and the right hearing assistance device to focus on the 45° signal, rather than having both devices try to focus on both signals. Alternatively, the hearing assistance devices can be programmed to monitor multiple angles of interest and adjust the directional polar pattern to focus on the one with the best SNR at any given point in time. It is noted that the decision on how best to optimize the directional polar patterns for the hearing assistance devices may be performed automatically by the hearing assistance devices or preferences may be set in the fitting software by the HAS fitter or on a remote control or smartphone application by the wearer.

According to some embodiments, the processor of an HAS can implement logic that specifies how the left and right hearing assistance devices should interpret the motion of the wearer. For example, if the HAS wearer starts moving, as detected by the positional sensors, the left and right hearing assistance devices need to know whether they should assume that the target/noise sources are fixed relative to the wearer, as would occur when a teacher is walking around a classroom with students seated at their desks, or whether the target/noise sources are also moving, as would occur in a moving vehicle. According to simpler implementations, the HAS processor can be programmed to assume that the target/noise sources are either fixed or moving. In more advanced implementations, information from the positional sensors and an acoustic analysis of the environment (e.g. ITDs/ILDs and other acoustic information) can be processed by the HAS processor to determine whether the wearer and the sound sources are moving together or independently.

Preferences for implementing directional microphone customization of a hearing assistance system can be established by an HAS fitter in his or her office using the manufacturer's HAS fitting software. Alternatively, or in addition, implementation preferences can be established by the wearer via a smartphone application or a remote control running an HAS fitting app. A number of different parameters can be configured by the HAS fitter or wearer, including the number of target sound sources that are allowed, the number of noise sources that are allowed, and functionality that occurs if the wearer attempts to save more target/noise sources than are allowed. For example, a preference can be established that the first or the last target/noise source is to be overwritten. As another example, the wearer can receive an audio indicator from the HAS stating that he or she has already used up all of the target/noise sources and will need to clear the existing one(s) to add more. The decibel level and verbiage of any audio indicators generated by the HAS can be established as preferences. For example, the wearer may want the HAS to say something like, "target 1", "target 2", "target 3", "full" to indicate how many target sources he or she has set. Similarly, the HAS may generate voice indicators for the number of noise sources (e.g., "noise 1", "noise 2", "noise 3") and to indicate resetting of the target/noise sources (e.g., "reset target sources", "reset noise sources", etc.).

In embodiments that include left and right hearing assistance devices (see, e.g., FIGS. 2, 5, 7, 10 and 11), communication between the left and right hearing assistance devices can provide additional functionality. As was previously discussed, the left and right hearing assistance devices can communicate via an NFMI or BLE link, for example. According to one illustrative scenario, the left hearing assistance device may have a microphone whose directional polar pattern is customized for enhancing reception of a target sound source located on the left side of the wearer (e.g., a person speaking proximate the wearer's left ear). The right hearing assistance device may have a microphone whose directional polar pattern is customized for attenuating reception of a noise source located on the right side of the wearer (e.g., crowd noise to the right of the wearer). Signal processing within the HAS may trigger a streaming feature by which audio from one hearing assistance device is streamed to the other hearing device. Depending on the nature of the audio, audio from one hearing assistance device can be combined with or replaced by audio from the other hearing assistance device. In this illustrative example, the audio from the left hearing assistance device (e.g., speech from the person sitting to the left of the wearer) can replace the audio from the right hearing assistance device (e.g., crowd noise). Parameters for implementing ear-to-ear streaming functionality can be established via HAS fitting software (e.g., whether the streamed signal replaces the signal of the other hearing assistance device or whether it is combined with it, and at what level).

According to some embodiments, data logging can be implemented by the processor and memory of the HAS to monitor and record various data. Such data can include, for example, how frequently the directional microphone customization feature is used, the number and locations of the target sound sources and noise sources, and the acoustic characteristics of the environment as determined by the hearing assistance devices (e.g., ITDs, ILDs, sound level estimates, SNR estimates, sound classification, etc.).

According to other embodiments, an HAS of the present disclosure can be paired with a visual tracking system (e.g., Google® glasses) such that after the angle of each target/noise source is identified, this information can be sent from the HAS to the glasses, which would then identify the source that is of interest at that angle. The glasses could then monitor the position of that source relative to the HAS wearer and report any changes in its relative position to the hearing assistance devices so that they can update their signal processing accordingly.

In further embodiments, additional technologies can be used to track the location of the targets of interest relative to the HAS wearer to make sure the desirable signals are being followed by the directional lobes while the undesirable signals are being cancelled by the nulls. Tracking may be aided by monitoring positional information from other technologies. Using the received signal strength indicator (RSSI) of the HAS's Bluetooth® radio, linear separation between the wearer and target sound source can be determined. For example, by using GPS data from the wearer's and target individuals' cell phones, separation and movement direction can be determined. Other locating technologies that can be used individually or in combination with an HAS of the present disclosure include cell tower based triangulation and GPS in combination with a phone inertial measurement unit (IMU).

According to one approach, if the distance to the target sound source can be tracked or estimated (e.g., based on the direct-to-reverberant ratio or the SNR), this information can be used to tighten or expand the lobe of the directional polar pattern of an HAS microphone(s). If sounds with certain acoustical properties (including peoples' voices) are repeatedly classified as targets or noises, the HAS can, over time, learn this information and automatically steer the lobe or the null toward these sounds when they are detected. Similarly, if the target sound sources or noise sources are always identified as being in the same positions relative to the HAS wearer in certain geographic locations (e.g., if someone always sits in the same spot at his/her favorite coffee shop, and the noise (e.g. coffee grinders) are always positioned in the same relative location to him/her), the hearing assistance devices can be configured to learn this information and automatically update the directional polar pattern when the listener is in that environment.

This document discloses numerous embodiments, including but not limited to the following:

Item 1 is a method implemented by a hearing assistance system comprising a left ear device and a right ear device respectively configured to be worn by a wearer, the method comprising:

determining, using one or more positional sensors of the hearing assistance system, a three-dimensional position of the hearing assistance system in response to the wearer looking at a sound source in space;

receiving an input to the hearing assistance system directly from the wearer while the wearer is looking at the sound source;

storing, in the hearing assistance system, the three-dimensional position of the hearing assistance system in response to the received input; and adjusting a directional polar pattern of one or more microphones of the hearing assistance system in response to the stored three-dimensional position.

Item 2 is the method of item 1, wherein:

the sound source is a target sound source of interest; and the directional polar pattern is adjusted to enhance reception of the target sound source of interest by the one or more microphones.

Item 3 is the method of item 1, wherein:

the sound source is a noise source; and the directional polar pattern is adjusted to attenuate reception of the noise source by the one or more microphones.

Item 4 is the method of item 1, comprising:

receiving a plurality of inputs to the hearing assistance system directly from the wearer when the wearer is looking at a corresponding plurality of sound sources;

storing, in the hearing assistance system, a plurality of three-dimensional positions of the hearing assistance system in response to the plurality of received inputs; and adjusting a directional polar pattern of one or more microphones of the hearing assistance system in response to the stored plurality of three-dimensional positions.

Item 5 is the method of item 1, comprising:
  receiving a first input to the hearing assistance system directly from the wearer when the wearer is looking at a target sound source of interest;
  receiving a second input to the hearing assistance system directly from the wearer when the wearer is looking at a noise source;
  storing, in the hearing assistance system, first and second three-dimensional positions of the hearing assistance system in response to the first and second received inputs; and
  adjusting a directional polar pattern of one or more microphones of the hearing assistance system in response to the stored first and second three-dimensional positions;
  wherein the directional polar pattern is adjusted to enhance reception of the target sound source of interest and attenuate reception of the noise source by the one or more microphones.

Item 6 is the method of item 1, wherein receiving the input comprises detecting actuation of a switch of the hearing assistance system by the wearer.

Item 7 is the method of item 1, wherein receiving the input comprises detecting a gesture made by the wearer by the hearing assistance system.

Item 8 is the method of item 1, wherein receiving the input comprises detecting, by the hearing assistance system, a voice command uttered by the wearer.

Item 9 is the method of item 1, comprising:
  tracking changes in the three-dimensional position of one or both of the hearing assistance system and the sound source; and
  adjusting the directional polar pattern of the one or more microphones in response to the tracked changes.

Item 10 is the method of item 9, wherein tracking the changes comprises:
  determining changes in an interaural time difference (ITD) between the left ear device and the right ear device; and
  determining changes in an interaural level difference (ILD) between the left ear device and the right ear device;
  wherein the directional polar pattern of the one or more microphones is adjusted in response to changes in the ITD and ILD.

Item 11 is the method of item 1, comprising:
  determining, using the one or more positional sensors, a change in elevation of the hearing assistance system while the wearer is listening to the sound source; and
  selecting one or a combination of the microphones for operation to enhance listening to the sound source in response to the elevation change.

Item 12 is a hearing assistance system comprising a left ear device and a right ear device respectively configured to be worn by a wearer, the hearing assistance system comprising:
  one or more microphones provided at each of the left and right ear devices;
  one or more positional sensors configured to determine a three-dimensional position of the hearing assistance system in response to the wearer looking at a sound source in space;
  a user interface configured to receive an input directly from the wearer;
  a memory configured to store the three-dimensional position of the hearing assistance system in response to the received input; and
  a processor configured to adjust a directional polar pattern of the one or more microphones provided at one or both of the left and right ear devices in response to the stored three-dimensional position.

Item 13 is the hearing assistance system of item 12, wherein:
  the sound source is a target sound source of interest; and
  the processor is configured to adjust the directional polar pattern to enhance reception of the target sound source of interest by the one or more microphones provided at one or both of the left and right ear devices.

Item 14 is the hearing assistance system of item 12, wherein:
  the sound source is a noise source; and
  the processor is configured to adjust the directional polar pattern to attenuate reception of the noise source by the one or more microphones provided at one or both of the left and right ear devices.

Item 15 is the hearing assistance system of item 12, wherein:
  the user interface is configured to:
    receive a first input directly from the wearer when the wearer is looking at a target sound source of interest; and
    receive a second input directly from the wearer when the wearer is looking at a noise source;
  the memory is configured to store first and second three-dimensional positions of the hearing assistance system in response to the first and second received inputs; and
  the processor is configured to adjust a directional polar pattern of one or more microphones provided at one or both of the left and right ear devices in response to the stored first and second three-dimensional positions;
  wherein the directional polar pattern is adjusted by the processor to enhance reception of the target sound source of interest and attenuate reception of the noise source by the one or more microphones provided at one or both of the left and right ear devices.

Item 16 is the hearing assistance system of item 12, wherein the user interface comprises a manually-actuatable switch on one or both of the left and right ear devices.

Item 17 is the hearing assistance system of item 12, wherein:
  the user interface comprises a coupling between the one or more positional sensors and the processor; and
  the user interface is configured to receive a signal from the one or more positional sensors indicative of a gesture made by the wearer.

Item 18 is the hearing assistance system of item 12, wherein:
  the user interface comprises voice recognition circuitry coupled to the one or more microphones provided at one or both of the left and right ear devices; and
  the voice recognition circuitry generates a signal in response to a voice command uttered by the wearer.

Item 19 is the hearing assistance system of item 12, wherein the one or more positional sensors comprise one or more of an accelerometer, a gyroscope, a GPS sensor, and a magnetometer.

Item 20 is the hearing assistance system of item 12, wherein the processor is configured to:
  track changes in one or both of the three-dimensional position of the hearing assistance system and the sound source; and
  adjust the directional polar pattern of the one or more microphones provided at one or both of the left and right ear devices in response to the tracked changes.

Item 21 is the hearing assistance system of item 20, wherein the processor is configured to:
  determine changes in an interaural time difference (ITD) between the left ear device and the right ear device;
  determine changes in an interaural level difference (ILD) between the left ear device and the right ear device; and
  adjust the directional polar pattern of the one or more microphones provided at one or both of the left and right ear devices in response to changes in the ITD and ILD.

Item 22 is the hearing assistance system of item 12, wherein the processor is configured to:
 determine, in response to the one or more positional sensors, a change in elevation of the hearing assistance system while the wearer is listening to the sound source; and
 select one or a combination of the microphones provided at one or both of the left and right ear devices for operation to enhance listening to the sound source in response to the elevation change.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method implemented by a hearing assistance system comprising a left ear device and a right ear device respectively configured to be worn by a wearer, the method comprising:
 determining, using one or more positional sensors of the hearing assistance system, a three-dimensional position of the hearing assistance system in response to the wearer looking at a sound source in space;
 receiving an input to the hearing assistance system directly from the wearer while the wearer is looking at the sound source;
 storing, in the hearing assistance system, the three-dimensional position of the hearing assistance system in response to the received input; and
 adjusting a directional polar pattern of one or more microphones of the hearing assistance system in response to the stored three-dimensional position.

2. The method of claim 1, wherein:
 the sound source is a target sound source of interest; and
 the directional polar pattern is adjusted to enhance reception of the target sound source of interest by the one or more microphones.

3. The method of claim 1, wherein:
 the sound source is a noise source; and
 the directional polar pattern is adjusted to attenuate reception of the noise source by the one or more microphones.

4. The method of claim 1, comprising:
 receiving a plurality of inputs to the hearing assistance system directly from the wearer when the wearer is looking at a corresponding plurality of sound sources;
 storing, in the hearing assistance system, a plurality of three-dimensional positions of the hearing assistance system in response to the plurality of received inputs; and
 adjusting a directional polar pattern of one or more microphones of the hearing assistance system in response to the stored plurality of three-dimensional positions.

5. The method of claim 1, comprising:
 receiving a first input to the hearing assistance system directly from the wearer when the wearer is looking at a target sound source of interest;
 receiving a second input to the hearing assistance system directly from the wearer when the wearer is looking at a noise source;
 storing, in the hearing assistance system, first and second three-dimensional positions of the hearing assistance system in response to the first and second received inputs; and
 adjusting a directional polar pattern of one or more microphones of the hearing assistance system in response to the stored first and second three-dimensional positions;
 wherein the directional polar pattern is adjusted to enhance reception of the target sound source of interest and attenuate reception of the noise source by the one or more microphones.

6. The method of claim 1, wherein receiving the input comprises detecting actuation of a switch of the hearing assistance system by the wearer.

7. The method of claim 1, wherein receiving the input comprises detecting a gesture made by the wearer by the hearing assistance system.

8. The method of claim 1, wherein receiving the input comprises detecting, by the hearing assistance system, a voice command uttered by the wearer.

9. The method of claim 1, comprising:
 tracking changes in the three-dimensional position of one or both of the hearing assistance system and the sound source; and
 adjusting the directional polar pattern of the one or more microphones in response to the tracked changes.

10. The method of claim 9, wherein tracking the changes comprises:
 determining changes in an interaural time difference (ITD) between the left ear device and the right ear device; and
 determining changes in an interaural level difference (ILD) between the left ear device and the right ear device;
 wherein the directional polar pattern of the one or more microphones is adjusted in response to changes in the ITD and ILD.

11. The method of claim 1, comprising:
 determining, using the one or more positional sensors, a change in elevation of the hearing assistance system while the wearer is listening to the sound source; and
 selecting one or a combination of the microphones for operation to enhance listening to the sound source in response to the elevation change.

12. A hearing assistance system comprising a left ear device and a right ear device respectively configured to be worn by a wearer, the hearing assistance system comprising:
 one or more microphones provided at each of the left and right ear devices;
 one or more positional sensors configured to determine a three-dimensional position of the hearing assistance system in response to the wearer looking at a sound source in space;
 a user interface configured to receive an input directly from the wearer;
 a memory configured to store the three-dimensional position of the hearing assistance system in response to the received input; and
 a processor configured to adjust a directional polar pattern of the one or more microphones provided at one or both of the left and right ear devices in response to the stored three-dimensional position.

13. The hearing assistance system of claim 12, wherein:
 the sound source is a target sound source of interest; and
 the processor is configured to adjust the directional polar pattern to enhance reception of the target sound source of interest by the one or more microphones provided at one or both of the left and right ear devices.

14. The hearing assistance system of claim 12, wherein:
the sound source is a noise source; and
the processor is configured to adjust the directional polar pattern to attenuate reception of the noise source by the one or more microphones provided at one or both of the left and right ear devices.

15. The hearing assistance system of claim 12, wherein:
the user interface is configured to:
  receive a first input directly from the wearer when the wearer is looking at a target sound source of interest; and
  receive a second input directly from the wearer when the wearer is looking at a noise source;
the memory is configured to store first and second three-dimensional positions of the hearing assistance system in response to the first and second received inputs; and
the processor is configured to adjust a directional polar pattern of one or more microphones provided at one or both of the left and right ear devices in response to the stored first and second three-dimensional positions;
wherein the directional polar pattern is adjusted by the processor to enhance reception of the target sound source of interest and attenuate reception of the noise source by the one or more microphones provided at one or both of the left and right ear devices.

16. The hearing assistance system of claim 12, wherein the user interface comprises a manually-actuatable switch on one or both of the left and right ear devices.

17. The hearing assistance system of claim 12, wherein:
the user interface comprises a coupling between the one or more positional sensors and the processor; and
the user interface is configured to receive a signal from the one or more positional sensors indicative of a gesture made by the wearer.

18. The hearing assistance system of claim 12, wherein:
the user interface comprises voice recognition circuitry coupled to the one or more microphones provided at one or both of the left and right ear devices; and
the voice recognition circuitry generates a signal in response to a voice command uttered by the wearer.

19. The hearing assistance system of claim 12, wherein the one or more positional sensors comprise one or more of an accelerometer, a gyroscope, a GPS sensor, and a magnetometer.

20. The hearing assistance system of claim 12, wherein the processor is configured to:
track changes in one or both of the three-dimensional position of the hearing assistance system and the sound source; and
adjust the directional polar pattern of the one or more microphones provided at one or both of the left and right ear devices in response to the tracked changes.

21. The hearing assistance system of claim 20, wherein the processor is configured to:
determine changes in an interaural time difference (ITD) between the left ear device and the right ear device;
determine changes in an interaural level difference (ILD) between the left ear device and the right ear device; and
adjust the directional polar pattern of the one or more microphones provided at one or both of the left and right ear devices in response to changes in the ITD and ILD.

22. The hearing assistance system of claim 12, wherein the processor is configured to:
determine, in response to the one or more positional sensors, a change in elevation of the hearing assistance system while the wearer is listening to the sound source; and
select one or a combination of the microphones provided at one or both of the left and right ear devices for operation to enhance listening to the sound source in response to the elevation change.

* * * * *